(12) United States Patent
Mestha et al.

(10) Patent No.: US 8,379,267 B2
(45) Date of Patent: Feb. 19, 2013

(54) METHOD TO RETRIEVE A GAMUT MAPPING STRATEGY

(75) Inventors: Lalit Keshav Mestha, Fairport, NY (US); Alvaro Enrique Gil, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 728 days.

(21) Appl. No.: 12/630,093

(22) Filed: Dec. 3, 2009

(65) Prior Publication Data
US 2011/0134447 A1 Jun. 9, 2011

(51) Int. Cl.
*H04N 1/60* (2006.01)
(52) U.S. Cl. ......... 358/1.9; 358/518; 358/520; 358/523; 345/590; 345/604
(58) Field of Classification Search .................... 358/1.9, 358/504, 518, 520, 523, 524; 382/162, 167; 345/590, 604
See application file for complete search history.

(56) References Cited

U.S. PATENT DOCUMENTS

| | | | |
|---|---|---|---|
| 5,483,360 A | 1/1996 | Rolleston et al. | |
| 5,734,802 A | 3/1998 | Maltz et al. | |
| 6,157,469 A | 12/2000 | Mestha | |
| 6,636,628 B1 | 10/2003 | Wang et al. | |
| 6,744,531 B1 | 6/2004 | Mestha et al. | |
| 7,397,581 B2 | 7/2008 | Mestha et al. | |
| 2004/0066524 A1* | 4/2004 | Lay et al. | 358/1.6 |
| 2004/0096104 A1* | 5/2004 | Terekhov | 382/167 |
| 2006/0170940 A1* | 8/2006 | Kang et al. | 358/1.9 |
| 2007/0035754 A1* | 2/2007 | Hori et al. | 358/1.9 |
| 2007/0081176 A1* | 4/2007 | Newman et al. | 358/1.9 |
| 2007/0139439 A1* | 6/2007 | Kim et al. | 345/604 |
| 2008/0043263 A1 | 2/2008 | Hancock et al. | |
| 2008/0043264 A1 | 2/2008 | Gil et al. | |
| 2008/0252931 A1 | 10/2008 | Mestha et al. | |
| 2008/0253649 A1 | 10/2008 | Wang et al. | |
| 2008/0309995 A1* | 12/2008 | Sasaki | 358/518 |
| 2009/0161125 A1 | 6/2009 | Mestha et al. | |
| 2009/0296107 A1 | 12/2009 | Mestha et al. | |
| 2010/0020106 A1 | 1/2010 | Gil et al. | |

OTHER PUBLICATIONS

U.S. Appl. No. 12/127,643, filed May 27, 2008, Mestha et al.
U.S. Appl. No. 12/391,473, filed Jul. 22, 2008, Gil et al.
U.S. Appl. No. 12/391,473, filed Feb. 24, 2009, Mestha et al.
U.S. Appl. No. 12/391,504, filed Feb. 24, 2009, Mestha et al.
U.S. Appl. No. 12/391,529, filed Feb. 24, 2009, Mestha et al.
K. M. Braun, R. Balasubramanian, and R. Eschbach, "Development and Evaluation of Six Gamut-Mapping Algorithms for Pictorial Images", *Proc. VII Color Imaging Conf.*, Scottsdale, pp. 144-148, 1999.

(Continued)

*Primary Examiner* — Kimberly A Williams
(74) *Attorney, Agent, or Firm* — Philip E. Blair; Fleit Gibbons Gutman Bongini & Bianco P.L.

(57) ABSTRACT

What is disclosed is a novel system and method for retrieving a gamut mapping for a color device. A ray-based model is derived from a system estimation of either a seed profile or a seed device. The model is hard coded inside a run-time ICC profile creation algorithm. The runtime profile generation code can be optimized for a variety of gamut mapping scenarios. The generated profile is provided to an imaging system wherein out-of-gamut colors are mapped to the color gamut of the host device. The present method provides an accurate way to reproduce colors of images by retrieving the gamut mapping from profiles or from the color device that use destination profiles for rendering images.

21 Claims, 6 Drawing Sheets

OTHER PUBLICATIONS

"Practical algorithm for the inversion of an experimental input-output color map for color correction", Sohil A. Dianat. Lalit K. Mestha. Daniel E. Vassolo. Yao R. Wang. International Society for Optical Engineering. Mar. 23, 2003, vol. 42 No. 3.

"Using the sRGB_v4_ICC_preference.icc profile", International Color Consortium. 2004.

"Specification ICC.1:2004-10 (Profile version 4.2.0.0) Image technology colour management—Architecture, profile format, and data structure", International Color Consortium. May 22, 2006.

"Recent developments towards control-based color profiling technology", Raja Bala. Alvaro E. Gil. Marty S. Maltz. Lalit K. Mestha. Yao Rong Wang. Xerox Research Center. Sep. 24, 2009.

G. J. Braun and M. D. Fairchild. Techniques for gamut surface definition and visualization. In IS&T/SID, pp. 147-152, Scottsdale Ariz., 1997.

E. D. Montag and M. D. Fairchild, "Gamut mapping: Evaluation of chroma clipping techniques for three destination gamuts." IS&T/SID Sixth Colour Imaging Conference, Scottsdale, 1998, p. 57-61.

Cholewo T J, Shaun L. Gamut Boundary Determination Using Alpha-shapes[C]//Proceedings of the 7th IS&T/SID Color Imaging Conference on Color Science, Systems and Applications. Scottsdale, Arizona: [s. n.], 1999.

P. Zolliker and K. Simon, "Continuity of gamut mapping algorithms,"J. Electron. Image., vol. 15, No. 1, pp. 13004-13004, Mar. 2006.

* cited by examiner

METHOD TO RETRIEVE A GAMUT MAPPING STRATEGY

TECHNICAL FIELD

The present invention is directed to systems and method for retrieving a gamut mapping from a historical database of device profiles or from profiles built on various color marking devices in a factory.

BACKGROUND

In digital imaging systems, color management is the controlled conversion between the color representations of various devices, such as image scanners, digital cameras, monitors, TV screens, film printers, marking devices, offset presses, and corresponding media. One of the primary goals of color management is to obtain a good match across color devices; for example, a video which should appear the same color on a computer LCD monitor, a plasma TV screen, and on a printed frame of video. Mapping of color spaces to the target color points of different target devices is used since many devices do not have the same gamut, or range of colors and brightness, that they are able to produce. For example, some colors outside of a target device's gamut need to be shifted to the inside of the gamut as they otherwise cannot be represented on the output device and would simply be clipped. Color mapping functions are used to adjust the numerical values that are sent to, or received from, different devices so that the perceived color they produce remains consistent. Techniques for dealing with out-of-gamut colors include gamut clipping and gamut compression. In gamut clipping, out-of-gamut colors are mapped to a color on the gamut surface in a way that minimizes degradation of the output, while in-gamut colors are left unaltered. In gamut compression, both in-gamut and out-of-gamut colors are altered to map the entire range of image colors to the printer gamut. Such color mapping is often performed during profile creation. Standardizing run-time custom profiling code becomes difficult to achieve as no single unique gamut mapping strategy is able to be applied to color space which simultaneously satisfies all requirements such as pleasing color, contrast, lightness, chroma, hue, and the like, across all out-of gamut color points.

When a print job has already been produced and a future reprint may be expected, then the color in the future reprint has to be retrieved from the original documents. The initial gamut mapping strategy employed is embedded in the customer's profiling code. The profile may have been produced with different algorithms and technologies. Many strategies are proprietary. Color performance of a given device, both in terms of image quality and computational time, often depends on the gamut mapping employed. There is a need for methods which can accurately retrieve the gamut mapping strategies employed from various initial sources such as the customer's ICC profile, etc.

Accordingly, what is needed in this art are increasingly sophisticated systems and methods for retrieving a gamut mapping to help ensure that original out-of-gamut colors are accurately reproduced during a subsequent mapping.

INCORPORATED REFERENCES

The following U.S. Patents, U.S. Patent Applications, and Publications are incorporated herein in their entirety by reference.

"Iteratively Clustered Interpolation For Geometrical Interpolation Of An Irregularly Spaced Multidimensional Color Space", U.S. Pat. No. 6,636,628.

"System And Method For Automated Spot Color Editor", U.S. patent application Ser. No. 11/507,405.

"Spot Color Controls And Method", U.S. patent application Ser. No. 11/507,406.

"Image Output Color Management System And Method", U.S. patent application Ser. No. 11/789,091.

"Ray-Based Compression Mapping In A Color Management System", U.S. patent application Ser. No. 12/177,178.

"Method, Apparatus And Systems To Retrieve GCRs From Historical Database", U.S. patent application Ser. No. 12/127,643.

"Merit Based Gamut Mapping In A Color Management System", U.S. patent application Ser. No. 12/391,473.

"Determining Whether A Color Is Inside Or Outside A Boundary Surface Of A Color Gamut", U.S. patent application Ser. No. 12/391,529.

"Mapping An Out-Of-Gamut Color To A Surface Of A Color Gamut", U.S. patent application Ser. No. 12/391,504.

"*The Levenberg-Marquardt Method*", Philip E. Gill, Walter Murray, and Margaret H. Wright, Academic Press, (January 1982), ISBN-13: 978-0122839528.

"*Numerical Methods For Least Squares Problems*", Björck, A., SIAM: Society for Industrial and Applied Mathematics; $1^{st}$ Ed. (1996), ISBN-13: 978-0898713602.

"*Recent Developments Towards Control-Based Color Profiling Technology*", Lalit K. Mestha, Alvaro E. Gil, Yao Rong Wang, Marty S. Maltz, and Raja Bala, Proc. IS&T's $25^{th}$ Int'l Conf. on Digital Printing Technologies, Louisville, Ky. (Sep. 20-24, 2009).

"*Billmeyer and Saltzman's Principles of Color Technology*", Roy S. Berns, Wiley Interscience, $3^{rd}$ Ed. (March 2000), ISBN-13: 978-0471194590.

"*Nonlinear Programming*", Dimitri P. Bertsekas, Athena Scientific; $2^{nd}$ Ed. (1999), ISBN-13: 978-1886529007.

"*Practical Algorithm For The Inversion Of An Experimental Input-Output Color Map For Color Correction*", D. E. Viassolo, S. A. Dianat, and L. K. Mestha, Journal of Optical Engineering, Vol. 42. No. 3, (March 2003).

"*Development and Evaluation of Six Gamut-Mapping Algorithms for Pictorial Images*", Karen M. Braun, Raja Bala, and Reiner Eschbach, IS&T/SID $7^{th}$ Color Imaging Conference: Color Science, Systems and Applications, Vol. 7, pp. 144-148, (November 1999), ISBN/ISSN: 0-89208-224-0.

"*International Color Consortium—Profile Specification Version 4.2*", (ICC-2004) describing image technology, architecture, profile format, and structure; 113 pages.

BRIEF SUMMARY

What is disclosed is a novel system and method for retrieving a gamut mapping for a color device. A ray-based model is derived from a system estimation of either a seed profile or a seed device. The model is hard coded inside a run-time ICC profile creation algorithm. The runtime profile code can be optimized for performance and computational time for a variety of gamut mapping scenarios. The profile is provided to an imaging system wherein out-of-gamut colors are mapped to the color gamut of the host device. The present method provides an accurate way to reproduce colors of images by retrieving the gamut mapping from profiles or from the color device that use destination profiles for rendering images.

In one example embodiment, the present method for retrieving a gamut mapping involves performing the following. A color transformation is used on the sampled color points to obtain input L*a*b* values. A system estimation is then performed on any of a seed device and a seed profile wherein a gamut mapping is incorporated, the system estimation using the input L*a*b* values to produce corresponding output L*a*b* values. The seed profile can be a historical color profile or an ICC profile. The seed device can be either a reference print engine or a proofing device. The input L*a*b* values and the corresponding output L*a*b* values comprise input-output L*a*b* pairs. For each of the input-output L*a*b* pairs, a ray is generated. The ray has an input L*a*b* value as a start point and the corresponding output L*a*b* value as an end point. Each of the generated rays comprises a ray-based color model for each input-output L*a*b* pairs. Out-of-gamut colors are mapped to an intersection of a boundary surface of a gamut of the host device using the ray-based models. Various embodiments for determining whether a color point is inside/outside the boundary surface of the host gamut and for mapping an out-of-gamut point to an intersection of a boundary surface of the host gamut are provided.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for retrieving a gamut mapping strategy from a historical database or from profiles built on various devices in the factory. The gamut mapping method is retrieved from profiles or from the color device that use destination profiles for rendering images. The present method comprises key steps: (1) performing system estimation (or identification) using the profile or the print engine in which the gamut mapping is incorporated; (2) deriving a model for the system estimation; (3) hard coding the model inside the run-time ICC profile creation algorithm; and (4) using the profile to retrieve the initial gamut mapping. The runtime profile code can be optimized for performance and computational time for a variety of gamut mapping scenarios.

It should be understood that one of ordinary skill in this art would be readily familiar with many facets of color science such as, but not limited to, color space, color gamuts, gamut mapping, and other related techniques and algorithms commonly found in the color science arts. Additionally, one of ordinary skill would also be familiar with advanced mathematical techniques used for color manipulation and various color transformation processes. Those of ordinary skill would be familiar with the text: "*Digital Color Imaging Handbook*", $1^{st}$ Ed., CRC Press (2003), ISBN-10: 084930900-X, ISBN-13: 97808-4930-9007, and "*Control of Color Imaging Systems: Analysis and Design*", CRC Press (2009), ISBN-13: 97808-4933-7468, both of which are incorporated herein in their entirety by reference.

Non-Limiting Definitions

A L*a*b* color space is a color-opponent space whose coordinates are given by {L*, a*, b*} with dimension L* for luminance and a* and b* for the color-opponent dimensions based on non-linearly compressed CIE XYZ color space coordinates. Luminance (L*) is a photometric quantity which, in essence, is the effect of radiance on our eyes. Chrominance (a*) is the chrominance of a first channel. Chrominance (b*) is the chrominance of a second channel. Radiance is the physical quantity related to light intensity, i.e., the power of the light spreading out in some solid angle over an area. Luminance is the integration of radiance weighted with a curve, which describes how efficiently different wavelengths of light trigger visual receptors in the eye. Brightness is the subjective visual experience of luminance, i.e., the effect of luminance on the brain.

The "gamut" refers to a complete subset of color values of a given color space as defined by the spectrum of light, i.e., the distribution of light energy versus wavelength, interacting with the spectral sensitivities of the eye's light receptors and the colorants on the substrate. One of the common usages refers to the subset of colors which can be accurately represented in a given circumstance, such as within a given color space or by a certain output device. Another refers to the set of colors found within an image at a given time. The gamut of a color marking device, for example, is a multi-dimensional color space having a given volume with the axes of the space being defined by the pigments used in the colorants of the primary colors. Each of the primary colors is transferred to the image-receiving medium. The color gamut is defined by the interaction of the primary colors, and is limited by an amount of toner that can be deposited on the image-receiving medium. Converting a digitized image to a different color space, or outputting it to a given medium using a certain output device, generally alters its gamut, in the sense that some of the colors in the original are lost in the color transformation process.

"Gamut mapping" or ("mapping out-of-gamut colors") refers to any algorithm or strategy which defines a relationship between a set of input color values of a first color gamut to a corresponding set of output color values of a second color gamut. The first and second color gamuts may or may not be in the same color space. Gamut mapping methods map received color values of an input image to the target gamut of the output device such that the rendered output colors remain visually consistent with the original image. There is no single common gamut mapping strategy. The present method is intended to retrieve a gamut mapping strategy that only maps out-of-gamut colors to a boundary surface of a gamut of a host device. The gamut mapping operation is incorporated into the nodes of a 3-D LUT. It should be appreciated that a quality gamut mapping function should first try to preserve hue, then try to preserve lightness and chroma as much as possible. It should also try to preserve as much spatial information, i.e., color relationships between neighboring pixels, as possible while minimizing artifacts such as halo effects, hue shifts, posterization, and the like, such that these are no longer visible when the output gamut-mapped color image is rendered to an image output device.

A "Device-Independent Color Space" is any non-singular transformation from XYZ color space to another color space. CIE XYZ tristimulus color space is one example of a device-independent color space. Other common device-independent color spaces are CIY L*u*v*, CIE L*a*b*, and LCH, which are obtained from XYZ using non-linear transformations which are well understood in this art. (For non-linear transformations pertinent to device-independent color spaces, see: Appendix A.6.1 of the above-referenced text: "Control of Color Imaging Systems: Analysis and Design").

A "Device-Dependent Color Space" is a color space which is not related to CIE XYZ through a non-singular transformation. An example of a device-dependent color space is the commonly understood RGB space. Adobe RGB, Apple RGB, NTSC RGB, Photoshop RGB, PhotoPro RGB, and Xerox RGB, are example device-dependent RGB color spaces. When referring to colorimetric or device-independent spaces, the reference is to color space definitions that are analytic or closed-form transforms of CIE XYZ space. When we refer to a device-dependent representation, we refer to a color space that is defined in terms of an operation of the device using it. While many color spaces have three dimensions, it is possible to have color spaces with less than three dimensions or more than three dimensions and likewise, it is possible for printers to use less than three colorants or more than four colorants. (For color transformations pertinent to device-dependent RGB color spaces, see: Appendix A.6.2 of the above-referenced text: "Control of Color Imaging Systems: Analysis and Design").

A "device-specific color value" is a color value of a device-dependent color space.

"Color separation" refers to taking an entire visual range of light reflected or transmitted by an original image and describing that range with individual colors. When these individual colors are combined for example on a printing device, a full-color reproduction of the original image is produced. The process of color separation starts by separating the original image into red, green, and blue components by using, for example, an image scanning device which provides pixel color values. The result is three grayscale images which represent the red, green, and blue components of the original image. Each of these separations is inverted. When a negative image of the red component is produced, the resulting image represents the cyan component. Likewise, negatives are produced of the green and blue to produce magenta and yellow separations, respectively. Because cyan, magenta, and yellow are subtractive primaries, each represents two of the three additive primaries (RGB) after one additive primary has been subtracted from white. Cyan, magenta, and yellow are the three basic colors used in color reproduction. However, due to limitations in the inks, darker colors tend to appear dirty or muddied. To resolve this, an amount of black separation is created to improve shadow and contrast.

"Color transformation" is a process which translates a color value of an input color space to a corresponding color value of an output color space. In conventional color management systems, a color transformation converts each input color space to an output target color space using mathematical algorithms. This calculation is required whenever data is exchanged inside a color-managed chain. Transforming profiled color information to different output devices is achieved by referencing the profile data into a standard color space. Methods to convert colors from one device to a selected standard and from that color space to the colors of another device are well established. By ensuring that the reference color space covers the many possible colors the human eye can see, colors obtained from an image input device can be accurately reproduced on an image output device. The mathematical algorithms of the color profiles for a given color transformation may be convolved into a single mathematical algorithm for efficiency.

A "printer model" converts values in a target color space to values in a device-independent color space. A printer model can have the form of a four-input to three-output look-up table (LUT) which can be updated using well-established techniques such as those described in Chapter 7 of the above-referenced text: "Control of Color Imaging Systems: Analysis and Design".

A "profile" contains a multidimensional color correction lookup table (LUT) generally comprising a series of nodes in an input color space (L*a*b* or XYZ), and device-specific (CMYK) output values stored at each node. When the input pixels to be corrected correspond to the nodes of the LUT, the corresponding device-specific color values are retrieved directly from the LUT. If the pixels are not on the node, then they are derived via interpolation using a variety of standardized techniques, such as, for example, tetrahedral interpolation. In general, a profile is derived from a forward model that maps a device-specific (CMYK) representation to a visual (L*a*b*) color representation. The L*a*b* or XYZ values are passed to a "destination profile", which defines yet another mathematical transformation between the amounts of the colorants from the reference color space and the destination color space that devices would need to use to render the color. These mathematical transformations are often embodied as multi-dimensional LUTs which provide the capability to match the printed color to a proofing device. A multi-dimensional profile LUT has finite nodes for which device CMYK values are calculated during profile creation. In general, a color profile is a description of a device-specific color space in terms of the transformations required to convert its color information to a device-independent color space. For example, a device-specific color space would define device-specific RGB or CMYK values.

A "seed profile" refers to a profile of a given device containing a gamut mapping strategy. The seed profile can be a historical color profile or any other profile with an inverse LUT and a forward LUT. It may not necessarily be in the ICC framework.

A "seed device" refers to the device for which the gamut mapping was previously generated. The seed device can be either a reference print engine or a reference proofing device. Proofing devices generally include densitometers, spectro-densitometers, printability tester, Pantone® color light boxes, and Pantone® color charts.

A "host profile" is the profile created for the host device.

A "host device" refers to the device for which the gamut mapping is being retrieved. The host device can be any color device capable of receiving commands to render a received signal of a color image to viewable form. To render an image includes displaying the image, outputting the image to a storage media, transmitting the image, or forming the image onto a media substrate through the visual integration of colorants (e.g., inks, toners, pigments, etc.) deposited thereon.

An "image processing system" is to a hardware or software system capable of processing an image for output to an image output device. Such a system is capable of performing a gamut mapping, as described herein, and may be incorporated, in whole or in part, within a given image output device or may be a separate system altogether such as, for instance, ASIC, DFE, or a standalone API.

An "image output device" is any device capable of rendering an image. The set of image output devices includes digital document reproduction equipment and other xerographic copier systems as are widely known in commerce, photographic production and reproduction equipment, monitors and other displays, computer workstations and servers, including a wide variety of color marking devices, and the like.

To "render" is to reduce an image (or a signal of an image) to a viewable form. Rendering, as used herein, is intended to also include storing the image to a memory or a storage device, or communicating the image to another device by transmitting a signal of the image over, for example, a network such as a LAN or Internet, where the stored image can be retrieved by a device capable of reducing the retrieved image to a viewable form.

"Storage Device" refers to a device or system to store electronic documents or images. One embodiment of a storage device is a database, as are well known in the arts, placed in communication with a computer system, workstation, and/or server, that is either remote from or collocated with a device hosting a computing process that accesses and/or stores documents within the storage system. Storage devices include RAM, ROM, processor cache, CD-ROM, DVD, flash drives, hard drives, and other media capable of storing electronic documents or images thereof.

L*a*b* values are computed from the tristimulus values (XYZ) using the following:

$$L^* = 116\left[f\left(\frac{Y}{Y_n}\right) - \frac{16}{116}\right]$$

$$a^* = 500\left[f\left(\frac{X}{X_n}\right) - f\left(\frac{Y}{Y_n}\right)\right]$$

$$b^* = 200\left[f\left(\frac{Y}{Y_n}\right) - f\left(\frac{Z}{Z_n}\right)\right]$$

$$f(x) = \begin{cases} x^{\frac{1}{3}} & \text{if } x \geq 0.008856 \\ 7.787x + \frac{16}{116} & x \leq 0.008856 \end{cases}$$

where $X_n$, $Y_n$, $Z_n$, are tristimulus values for the reference white.

Example Flow Diagram

Figure 1:
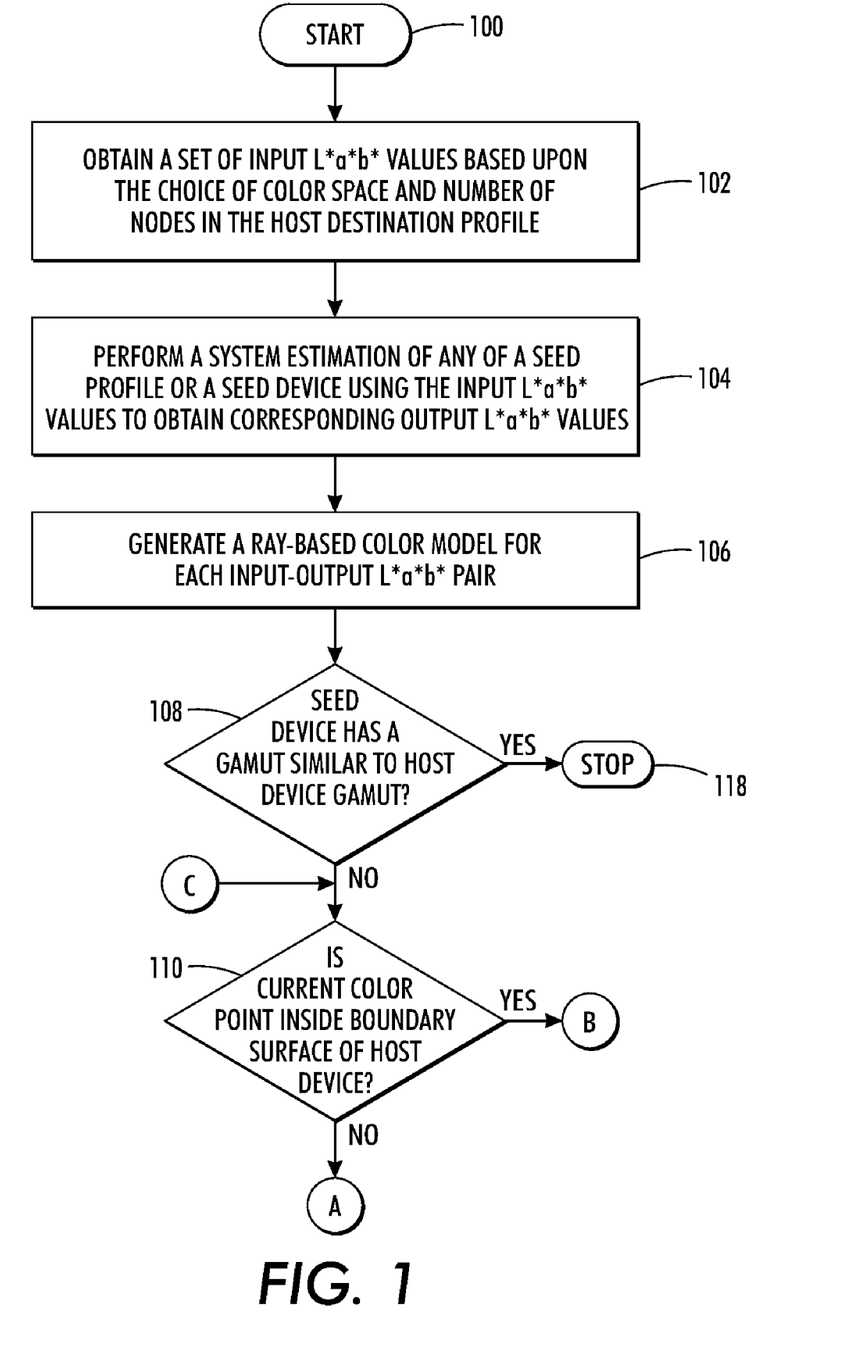
FIG. 1 illustrates a flow diagram of one example embodiment of the present method for retrieving a gamut mapping strategy.
Figure 2:
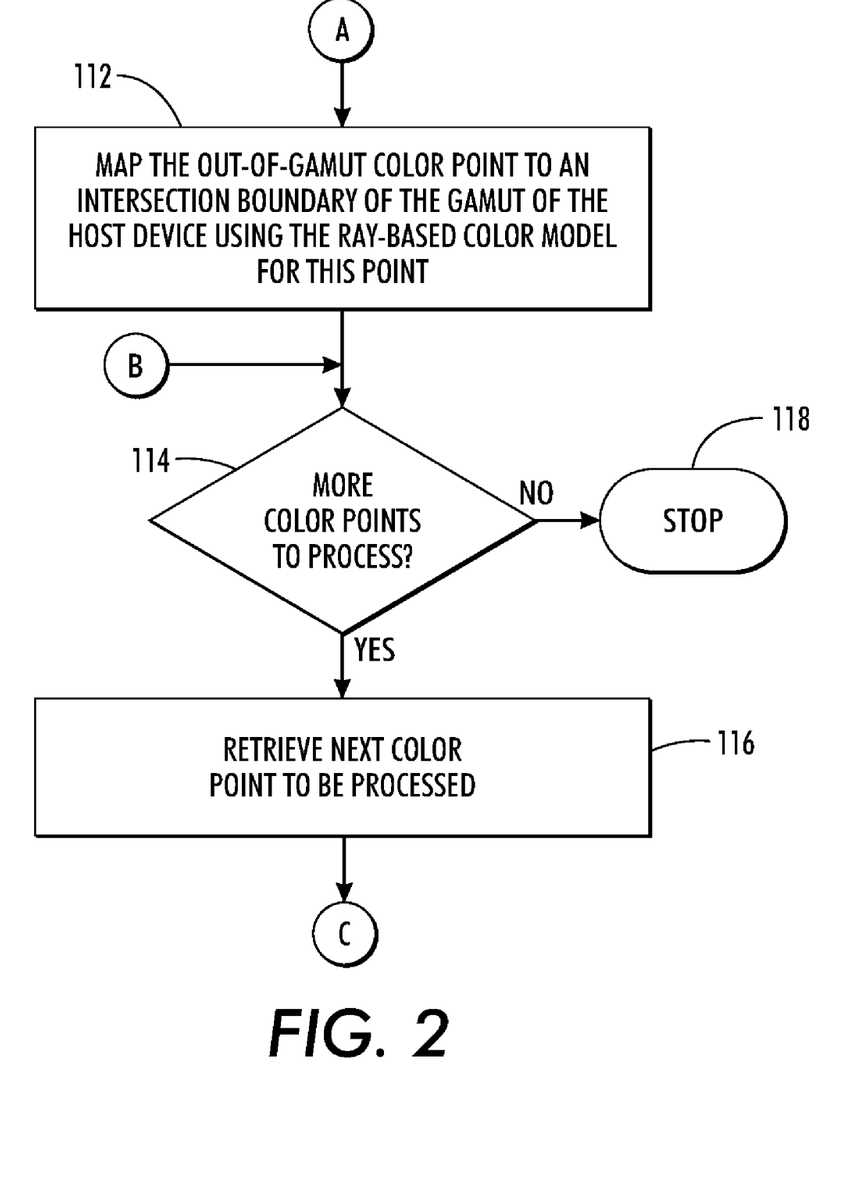
FIG. 2 is a continuation of the flow diagram of FIG. 1 with flow processing continuing with respect to node A.

Reference is now being made to the flow diagrams of FIGS. 1 and 2 which collectively illustrate one example embodiment of the present method for retrieving a gamut mapping.

The flow begins at 100 and immediately proceeds to 102 wherein a set of input L*a*b* values are obtained based on the choice of color space and number of nodes in the host destination profile. For example, if we start with RGB as the intermediate color space (see Chapter 7, FIG. 7.2 of the above-referenced text: "*Control of Color Imaging Systems: Analysis and Design*"), then each RGB axis is uniformly sampled (e.g., 33 levels) and the L*a*b* values obtained through a color transformation, such as that used by ProPhotoRGB. For a $33^3$ size profile, a set of $33^3$ input L*a*b* values are generated.

At step 104, a system estimation is performed on either a seed device or a seed profile wherein a gamut mapping strategy is incorporated to obtain output L*a*b* values for each input L*a*b* values. If a seed profile is used, then the system estimation comprising processing the input L*a*b* values through the seed profile to produce the output L*a*b* values. Alternatively, device-specific color values are processed through a printer model of the seed device contained in the seed profile to generate the output L*a*b* values. If a seed device is being used, then system estimation comprises printing test patches which contain defined input L*a*b* values and measuring reflectance values from the printed patches using a spectrophotometer device. Two-dimensional reflectivity values can be obtained using, for example, a color scanner bar instrumented to measure color on a paper media. The output L*a*b* values are determined from the reflectivity values. One of ordinary skill would appreciate that measurement guidelines relating to paper, white point, stock backing (if an off-line sensor is used), averaging with multiple sets, etc., need to be adhered. Alternatively, output L*a*b* values are retrieved from a memory or storage device, or from a remote computing device over a network connection via a communications interface such as a modem or router. Each of the input L*a*b* values and their corresponding output L*a*b* values comprise input-output L*a*b* pairs.

At 106, a ray is generated for each of the input-output L*a*b* pairs. The ray, for each pair, has an input L*a*b* value as a start point (start color) and the corresponding output L*a*b* value as an end point (end color). Each ray defines a ray-based color model for each node color pair. The node pairs may be stored in a storage device or a database for subsequent retrieval, or may be uploaded to a remote device over a network such as the Internet or LAN in a manner which is well established. The process of ray generation can be described more formally as follows. For a given node color, let the input-output L*a*b* pair be designated as start and end points of a line in three-dimensional color space. Let $x_c$ be the start color and $x_0$ be the end color with coordinates $\{L^*_c, a^*_c, b^*_c\}$ and $\{L^*_0, a^*_0, b^*_0\}$, respectively. One can think of the start color, $x_0$, as the unmapped color (i.e., target L*a*b* derived from RGB color space) and the end color, $x_c$, as the mapped color to the gamut of the seed device.

The generated ray can be modeled by an equation connecting these two points in 3-dimensional space. Such an equation is given by:

$$x = x_0 + mi \qquad (1)$$

such that:

$$x = \begin{bmatrix} L \\ a \\ b \end{bmatrix}, \quad x_0 = \begin{bmatrix} L_0 \\ a_0 \\ b_0 \end{bmatrix}, \quad m = \frac{1}{N}\begin{bmatrix} L_c - L_0 \\ a_c - a_0 \\ b_c - b_0 \end{bmatrix} \qquad (2)$$

where m is the slope of the line, and N is the number of points such that, for index i=0 to N, a total of N+1 points are defined along the ray, each of the defined points having color values represented by point $x_i$ where i is the index incremented between two integers (e.g., from 0 to 2N). When i=0, the ray will be at color point $x=x_0$. When i=N, the ray will be at color point $x=x_c$. The slope m, and the intercept point $\{L^*_0, a^*_0, b^*_0\}$, are the parameters used during profile creation. The ray model is coded in the run-time profile creation algorithm for use in step 112.

A Gray Component Replacement (GCR) LUT can be used to extract the nominal CMYK values for a given point $x_i$ having coordinates $\{L^*_i, a^*_i, b^*_i\}$ in $L^*a^*b^*$ space. Such techniques are well established. Executing a Gray Component Replacement/Under Color Removal (GCR/UCR) strategy converts CMY color space parameters to CMYK color space parameters. These values represent colors of a typical four-color marking device. Briefly, GCR is a strategy wherein the inherent gray component of color points in a three-color space is replaced with a fourth color, black (K) component. GCR provides a smooth transition between neighboring nodes in a CMYK color space. Smoothness can be preserved by using two algorithms: (1) a MIMO control algorithm, and (2) a neighbor detection algorithm in $L^*a^*b^*$ space. Neighboring pairs cooperate mutually in exchanging information in order to provide a smooth transition between them in CMYK space. In instances where smoothness may not be fully preserved, which may occur in cases when a printer is highly nonlinear or when nodes in the LUT are sparse, a multi-dimensional filtering algorithm may be further utilized to refine the formulations. Under Color Removal (UCR) is usually used when colors are near the neutral axis of a given color space, such as, for example, the $L^*$ axis in $L^*a^*b^*$ space or the C=M=Y axis in CMY space. GCR is similar to UCR, but can be used with colors throughout the color gamut, not just near or at neutral axes, to improve constraints on area coverage. Since GCR plays an important role in high quality color reproduction using toner or inks, if CMYK formulations are not smooth between nodes of the profile LUT, contours may arise. In such cases, a 3D smoothing algorithm can be further utilized. (See, §6.6.2.3, pp 290, of the above-referenced text: "Control of Color Imaging Systems: Analysis and Design").

At step 108, a determination is made whether the seed device has a gamut which is substantially similar to the gamut of the host device. Such a determination is based upon having a same color space, a substantially similar gamut volume, and the like. If the seed device has a gamut which is determined to be substantially similar to the gamut of the host device then no further processing is required because the end points of each of the rays is close enough to the gamut surface of the host device for color reproduction. As such, further processing stops. Otherwise, processing proceeds with respect to step 110.

At step 110, a determination is made whether the current color point is inside or outside a boundary surface of the host device gamut. If the current color is inside the boundary surface of the gamut of the host device then this point does not need to be processed further. As such, further processing proceeds with respect to node B of FIG. 2 wherein a determination is made whether further color points remain to be processed. In one embodiment, determining whether color point $x_c$ having coordinates $\{L^*_c, a^*_c, b^*_c\}$ in $L^*a^*b^*$ space is inside/outside a boundary surface of the gamut of the host device involves performing the following. First, a threshold error value is initialized to a default value. An amount of $\Delta E$ color separation is determined between the obtained $L^*a^*b^*$ values and the $\{L^*_c, a^*_c, b^*_c\}$ values of point $x_c$. The amount of $\Delta E$ color separation is then compared to the threshold error value. If the amount of $\Delta E$ color separation is less than the threshold error value then end point $x_c$ is determined to be inside the boundary surface of the gamut of the host device. In which case, processing proceeds with respect to node B of FIG. 2 wherein, at step 114, a determination is made whether additional color points remain to be processed. Otherwise, the color point $x_c$ is determined to be outside the boundary surface of the gamut of the host device. In which case, processing proceeds with respect to node A of FIG. 2 (step 112).

At step 112, the out-of-gamut color point $x_c$ is mapped to an intersection boundary of the gamut of the host device using the ray-based color model associated with point $x_c$. In one embodiment, mapping the out-of-gamut color point involves iteratively performing the following. First, the line traced between points $x_c$ and $x_0$ is extended an arbitrary length along a same slope m of the associated ray. Thereafter, the extended line is divided into a plurality of discrete points. Each discrete point $x_i$ is given by coordinates $\{L^*_i, a^*_i, b^*_i\}$. A threshold error is initialized to a default value. For each discrete point $x_i$ along the extended line, an amount of $\Delta E$ color separation is calculated between $L^*a^*b^*$ values obtained on a previous iteration and $\{L^*_i, a^*_i, b^*_i\}$ values of current point $x_i$. The amount of $\Delta E$ color separation is compared against the threshold error. If the amount of $\Delta E$ color separation is greater than the threshold then point $x_i$ is not inside a boundary surface of the gamut. In which case, the amount of $\Delta E$ color separation is processed with the $\{L^*_i, a^*_i, b^*_i\}$ values of point $x_i$ to produce new $L^*a^*b^*$ values to be used on a next iteration. The above steps are repeated until the current point is determined to be inside the boundary surface of the gamut, i.e., the extended ray intersects the surface of the host gamut. When all discrete points along the line have been exhausted for in/out determination, the line is again extended along a same slope m and the extended line segment is again divided into a number of discrete points and the process is repeated until $x_i$ is determined to be inside an intersection of the boundary surface of the gamut of the host device. Once the color point has been mapped to an intersection of a boundary surface of the host gamut, processing proceeds with respect to step 114.

At 114, a determination is made whether any more color points remain to be processed. If so, at step 116, a next color point is retrieved and processing proceeds with respect to node C of FIG. 1. Processing repeats in a similar manner until all out-of-gamut color points have been mapped to the gamut of the host device. Once all the colors have been processed, the method stops at step 118.

The following describes how to quickly identify where the intersection points are on the boundary surface of the gamut of the host device.

First, rewrite Eq. 1 as follows:

$$\_x = x_0 + m' \begin{bmatrix} L_c - L_0 \\ a_c - a_0 \\ b_c - b_0 \end{bmatrix} \quad (3)$$

where m' is a real number.

Using only $L^*a^*b^*$ out-of-gamut nodes of the host profile, convert these out-of-gamut $L^*a^*b^*$ values to device-dependent color values in CMYK color space.

Figure 3:
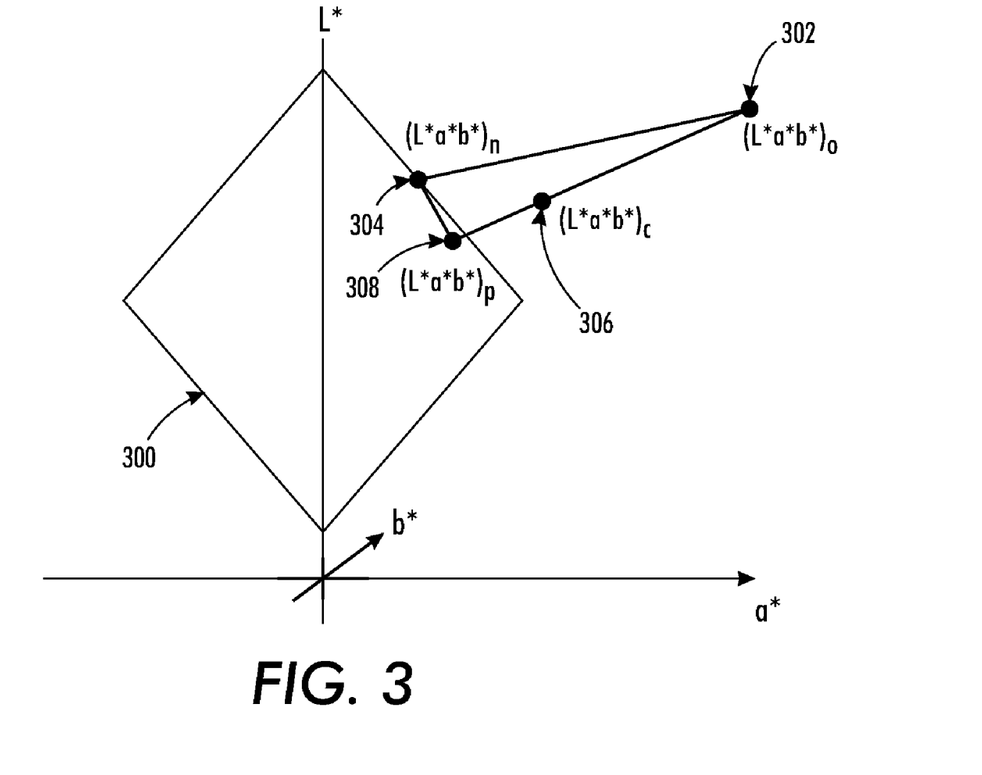
FIG. 3 shows a schematic diagram of ray projections between start point $(L*a*b*)_0$ and end point $(L*a*b*)_c$ to a surface of gamut 300 of a host device.

As shown in FIG. 3, the ray is between start point $x_0$ having coordinates $\{L^*_0, a^*_0, b^*_0\}$, alternatively written as point $(L^*a^*b)_0$, (shown at 302), and end point $x_c$ having coordinates $\{L^*_c, a^*_c, b^*_c\}$, alternatively written as point $(L^*a^*b)_c$, (at 306). Start point 302 is projected onto host gamut 300 using the gamut mapping of the host profile to $\{L^*_h, a^*_h, b^*_h\}$, alternatively written as $(L^*a^*b)_h$, (at 304) which is estimated using the host printer model. Since the $(L^*a^*b)_h$ values for each out-of-gamut node color might not be on the ray, compute the minimum Euclidean distance to point $(L^*a^*b)_p$ (at 308). Alternatively, the $(L^*a^*b)_h$ values for each out-of-gamut node color are determined using methods known in this art such as, for example, Iteratively Clustered Interpolation (ICI), State Feedback (MIMO), or Model Predictive Control (MPC) using the host printer model.

Once the $(L^*a^*b)_p$ values have been obtained, solve for $m_p$ using the following relationship:

$$m_p = \frac{B * A^T}{A * A^T} \quad (4)$$

where $B = [(L^*a^*b)_p - (L^*a^*b)_0]^T$, $A = [(L^*a^*b)_c - (L^*a^*b)_0]^T$ and $[(L^*a^*b)_c] \neq [(L^*a^*b)_0]$. Apply for several points along the ray with $m' \in [m_p - \delta, m_p + \delta]$, where $\delta$ represents a neighborhood around point $m_p$. Repeat for each $(L^*a^*b)_h$ value.

Since this method focuses on a relatively small region with less number of points using the host printer model (or printer), time required for searching the gamut intersection point can be reduced.

Gradient-based methods can be used to obtain m' in Eq. 3 modified as follows:

$$x(j+1) = x(j) + m'(j)(x(j) - \hat{x}(j)) \quad (5)$$

The vector x(j) contains the current $L^*a^*b^*$ values of a point on the ray. ICI, MIMO, or MPC methods can be applied using the host printer model to determine vector $\hat{x}(j)$. If vector $x(j)$ is outside of the host gamut, then vector $x(j)$ will be mapped to the host gamut boundary, i.e., $\hat{x}_h(j)$. Since this mapped color might not be on the ray, projection can be used to determine the closest point on the ray between $\hat{x}_h(j)$ and the ray, i.e., $\hat{x}(j)$. Let j denotes the number of iterations of the algorithm then m' can be determined using, for example, a Gauss-Newton method. Gauss-Newton is one method which is used to solve non-linear squares problems and is essentially a modification of Newton's method for finding roots of equations in one or more dimensions. Unlike Newton's method, the Gauss-Newton algorithm can be used to minimize a sum of squared function values, but it has the advantage that second derivatives, which can be challenging to compute, are not required.

Applying Gauss-Newton to Eq. 5 obtains the following:

$$m'(j+1) = m'(j) - (\nabla \epsilon(m(j)) \nabla \epsilon(m(j))^T)^{-1} \nabla \epsilon(m(j)) \epsilon(m(j)) \quad (6)$$

where $\epsilon(m(j)) = x(m'(j)) - \hat{x}(m'(j))$ and $\nabla \epsilon(m(j)) = x(j) - \hat{x}(j)$.

If we want to avoid problems with the computation of the inverse in Eq. 6, the Levenberg-Marquardt method can be used to update the value of m'.

The Levenberg-Marquardt method is an alternative to the Gauss-Newton method. It can be used for finding a minimum of a function F(x) that is a sum of squares of nonlinear functions wherein:

$$F(x) = \frac{1}{2} \sum_{i=1}^{m} [f_i(x)]^2.$$

The Levenberg-Marquardt method searches in the direction given by the solution $\rho$ to the equations:

$$(J_k^T J_k + \lambda_k I) \rho_k = -J_k^T f_k,$$

where the Jacobian of $f_i(x)$ is $J_i(x)$, $\lambda_k$ are non-negative scalars, and I is the identity matrix.

Applying the Levenberg-Marquardt method to Eq. 5, the following is obtained:

$$m'(j+1) = m'(j) - (\nabla \epsilon(m(j)) \nabla \epsilon(m(j))^T + \Gamma(j))^{-1} \nabla \epsilon(m(j)) \epsilon(m(j)) \quad (7)$$

where $\Gamma(j)$ is a square diagonal matrix, such that:

$$\nabla \epsilon(m(j)) \nabla \epsilon(m(j))^T + \Gamma(j),$$

is invertible. The above-described step (c) should be applied to each color point x(j) once the variable m' has converged to a stationary value.

Another optimization technique can also be applied to Eq. 5 to find m'. This entails the following. Find the m'>0 value such that, for each out-of-gamut color point, $\Delta E(x, \hat{x})$ is minimized. That vector x lies on the ray defined by the above-described process.

Various embodiments of the gamut mapping strategy retrieval methods provided herein are intended to be performed in an image processing system. Such a system includes a processor capable of reading machine-executable instructions stored in an addressable memory (or processor cache) or local storage device. The processor retrieves instructions for performing various aspects of the above-described methods, and executing such instructions. Generally, various program modules in an image processing system would include routines, objects, components, etc., that perform particular tasks. Various data structures would further be employed to implement particular abstract data types as are well known in the programming arts.

Figure 4:
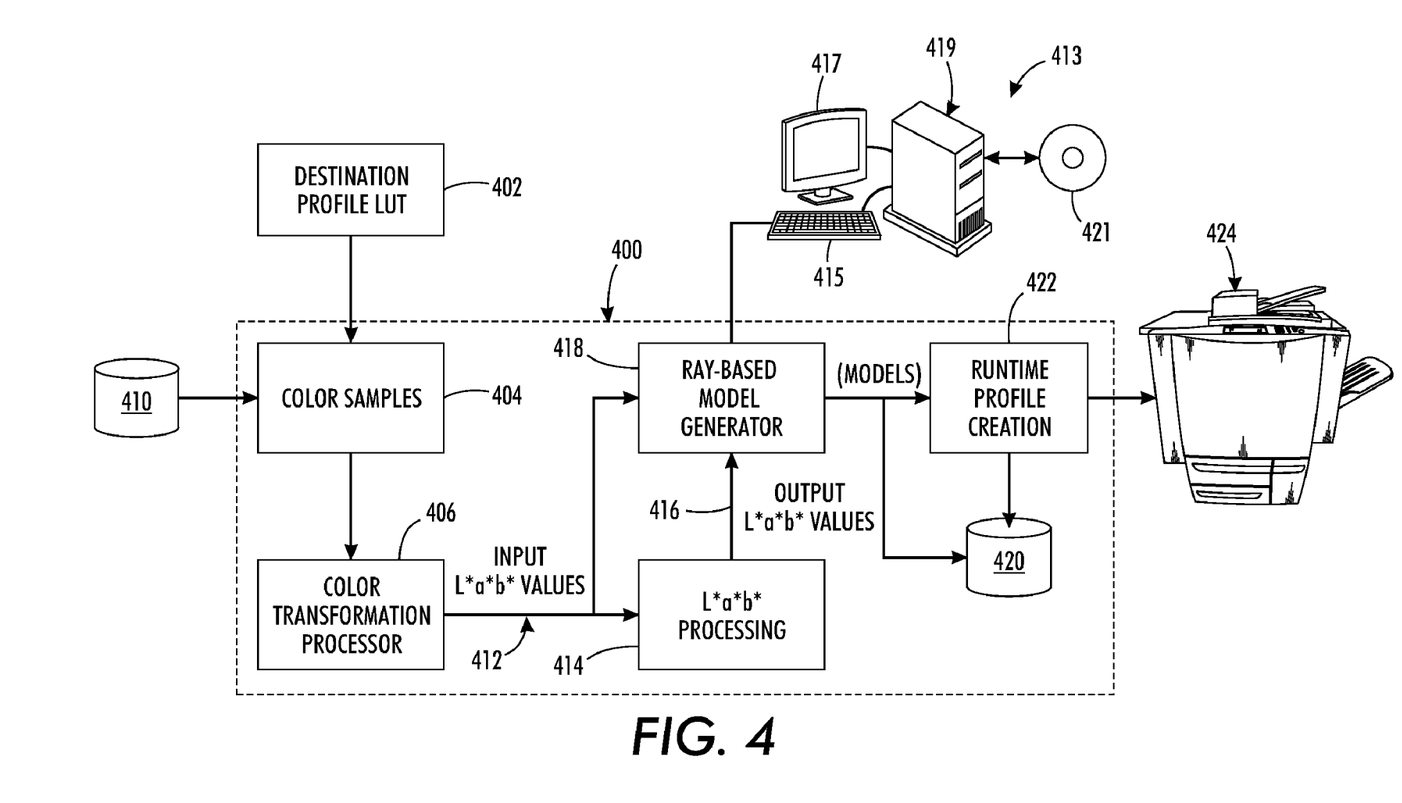
FIG. 4 is a block diagram of an example image processing system which receives a destination profile LUT of a host device and wherein various aspects of the present method for retrieving a gamut mapping strategy are performed in a manner as described with respect to the flow diagrams of FIGS. 1 and 2.

Reference is now being made to FIG. 4 which is a block diagram of an example image processing system which receives a destination profile LUT of a host device and wherein various aspects of the present method for retrieving a gamut mapping strategy are performed in a manner as described with respect to the flow diagrams of FIGS. 1 and 2.

The illustrated embodiment of system 400 generally comprises a color sampler 404 for sampling color points along axes of a color space over a number of nodes defined by the destination profile LUT 402. Such a sampling may be performed using either a hardware or software construct or which receives data values from storage device 410. The storage device which may be a memory, cached, ROM/RAM, or disk drive database, or a remote database accessible over a network (now shown). Color transformation processor 406 is a process or special purpose computer system capable of executing machine readable instructions designed to perform a color transformation on the sampled color points to generate input $L^*a^*b^*$ values (at 412). Processor 406 may further incorporate a cache memory or utilize addressable memory, such as ROM/RAM or an external storage device (not shown). The computed input $L^*a^*b^*$ values 412 are provided to $L^*a^*b^*$ processing module 414 wherein the input $L^*a^*b^*$ values are processed to obtain corresponding output $L^*a^*b^*$ values 416 in a manner as previously described above. If system estimation is being performed on a seed profile, processing the input $L^*a^*b^*$ values comprises processing the device-specific colors through a printer model contained in the seed profile to obtain corresponding output $L^*a^*b^*$ values. If the system estimation is being performed on the seed device, processing input $L^*a^*b^*$ values, in one embodiment, comprises iteratively printing test patches containing defined input $L^*a^*b^*$ values, measuring color values of the printed test patches to obtain the output $L^*a^*b^*$ values. The measured output $L^*a^*b^*$ values can be entered as input-output $L^*a^*b^*$ pairs and provided to model generator module 418 via the graphical user interface of computer workstation 413 shown generally comprising a keyboard 415, monitor 417, case 419 housing a motherboard, processor, hard drive, CD-ROM drive, and a network interface card (not shown), and a rewriteable media 421 for storing executable machine readable program instructions and data. In model generator module 418, for each of the input-output $L^*a^*b^*$ pairs, a ray is generated. Each ray has an input $L^*a^*b^*$ value as a start point and a corresponding output $L^*a^*b^*$ value as an end point. Each ray defines a ray-based color model for each of the input-output L*a*b* pairs. Model generator 418 includes a special purpose processor for computing a ray between the start color and end color in a manner as described above. The ray-based color models are then provided to runtime profile creation module 422 wherein a profile is created using the ray-based models. In one embodiment, the ray-based color models are provided to storage device 420 which, although shown internal to system 400, may communicate with an external memory or storage. The profile is provided to image output device 424 wherein out-of-gamut colors are mapped to an intersection of a boundary surface of a color gamut of a host device in a manner as previously described.

The teachings hereof are intended to find their implementations in an image processing system placed in the image path of a digital document reproduction device.

Figure 5:
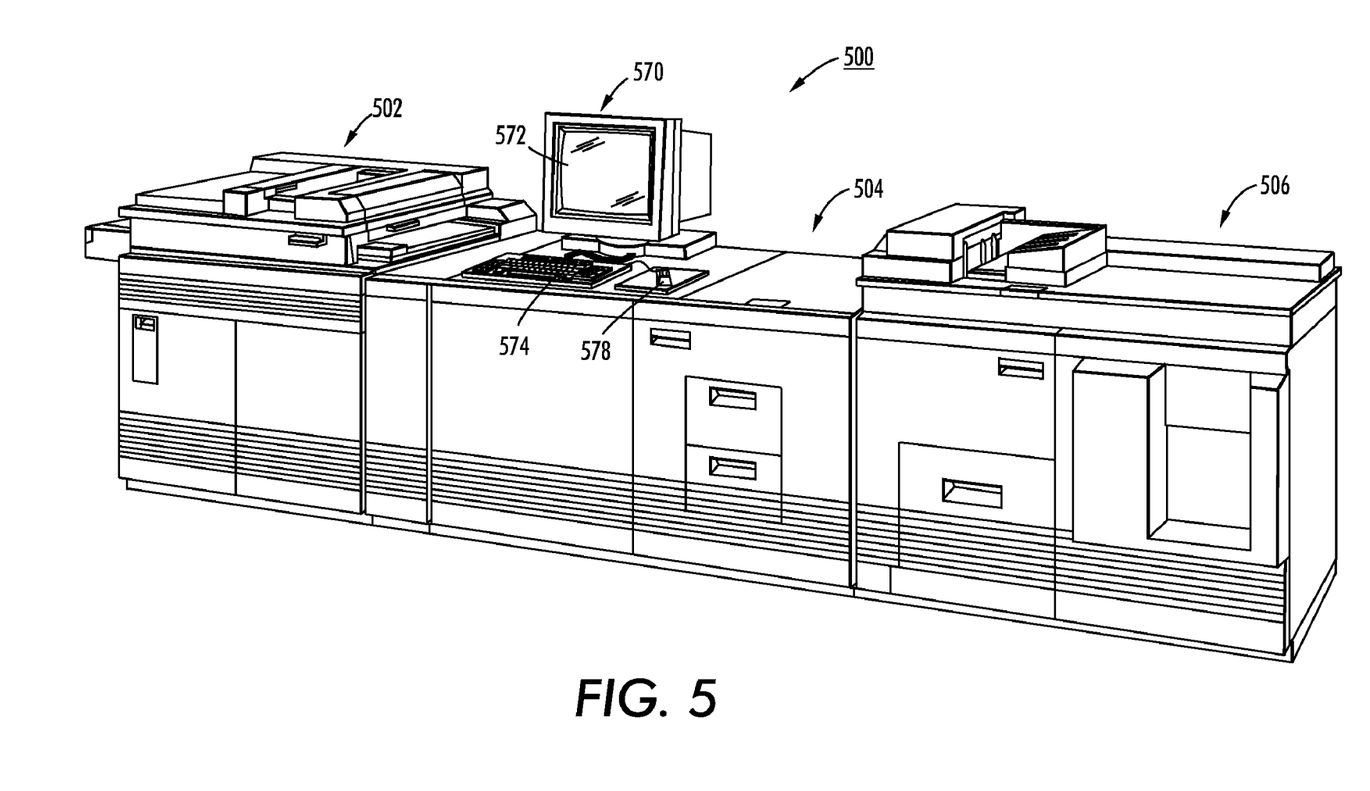
FIG. 5 shows an example digital document reproduction system wherein various aspects of the image processing system of FIG. 4 and the embodiments discussed with respect to the flow diagrams of FIGS. 1 and 2, and the schematic diagram of FIG. 3 would be incorporated.

Reference is now being made to FIG. 5 which shows an example digital document reproduction system wherein various aspects of the image processing system of FIG. 4 and the embodiments discussed with respect to the flow diagrams of FIGS. 1 and 2 would be incorporated. Although various embodiments hereof have been described with respect to a digital document reproduction device capable of 4-color (CMYK) separations, it should be understood that the present method is applicable to a digital document reproduction device capable of 3-color (CMY) separations, or to a device capable of document reproduction in N-color separations, where N>4. For example, if N=6, the colorants of such a device may comprise the colors of: Cyan (C), Magenta (M), Yellow (Y), Black (K), Orange (O), and Violet (V), collectively referred to as CMYKOV.

Example image output device 500 includes a paper feeder module 502, a printing module 504, and a finisher module 506. The digital document reproduction system 500 is shown incorporating a user interface 510 shown generally comprising display 512, keyboard 514, and mouse 518. The user interface may be used by a key operator to set parameters and control other document processing operations. The instructions for these various operations may be input via the keyboard and/or mouse, or touch screen objects displayed on the display. The paper feeder module includes a scanning device for receiving a digital representation of a scanned document. Finisher 506 includes a discharge area 522 where finished documents are deposited for retrieval. Such a complex xerographic printing system would include various device controllers and other special purpose computer processors capable of executing machine executable program instructions for performing various aspects of the present method as described with respect to the flow diagrams of FIGS. 1 and 2, the schematic diagram of FIG. 3, and the image processing system of FIG. 4. Such a device would include one or more network connections for receiving and/or transmit input or output image data over a network via a wire, cable, modem, or wireless device. System 500 may further incorporate a CD-ROM or other drive device wherein a removable media can inserted and data deposited thereon. Those skilled in the art will appreciate that the teachings hereof may be practiced with other system configurations, including multi-processor systems, microprocessor-based or programmable devices, networked PCs, minicomputers, mainframe computers, hand-held devices, and the like. Certain aspects of such a system would operate in accordance with pre-programmed instructions to carry out the methods disclosed herein and claimed. Such a system might include a commercially available graphics rendering capability that can also be associated with a networked storage medium or similar memory devices accessible via an Internet or intranet.

It is also contemplated that one or more aspects of the present method may be implemented on a dedicated computer system or workstation, and may also be practiced in distributed computing environments where tasks are performed by remote processing devices that are linked through a communication network. In a distributed computing environment, program modules for performing various aspects of the present system and method. Other embodiments include a special purpose computer designed to perform the methods disclosed herein.

Figure 6:
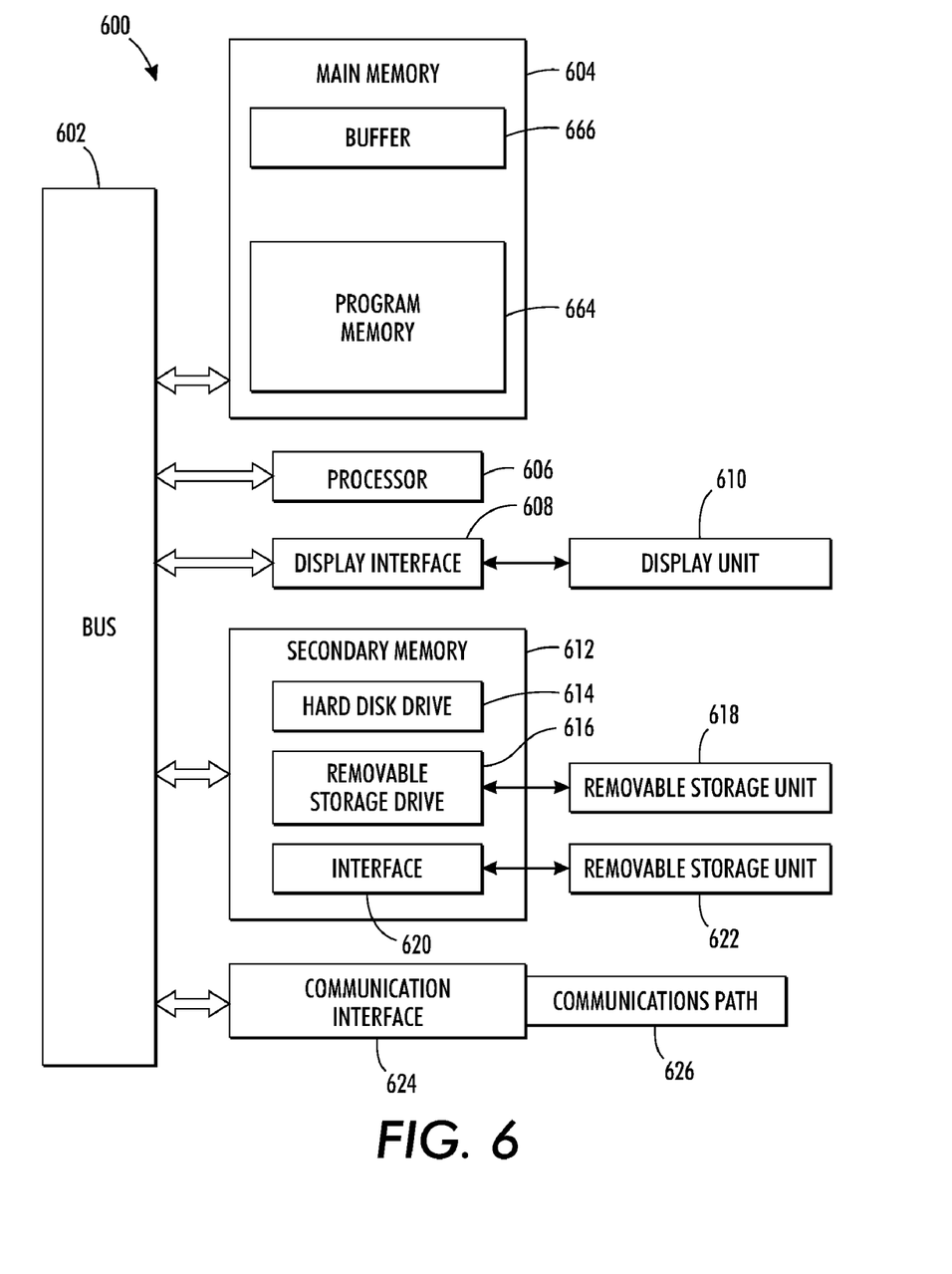
FIG. 6 illustrates a block diagram of one example embodiment of a special purpose computer system located in the digital document reproduction system of FIG. 5 for implementing one or more aspects of the present method as described with respect to the embodiments of FIGS. 1-4.

Reference is now being made to FIG. 6 which illustrates a block diagram of one example embodiment of a special purpose computer system located in the digital document reproduction system of FIG. 5 for implementing one or more aspects of the present method as described with respect to the embodiments of FIGS. 1-4 Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing system, which includes a processor capable of executing machine readable program instructions for carrying out one or more aspects of the present method. All or portions of the diagrams of the present method, as illustrated herein, may be implemented partially or fully in hardware in conjunction with machine executable instructions in communication with various components of such a system. The nature of the exact implementation will depend on the image processing environment wherein the present method finds its intended uses.

Special purpose computer system 600 includes processor 606 for executing machine executable program instructions for carrying out all or some of the various aspects of the present method. The processor is in communication with bus 602. The system includes main memory 604 for storing machine readable instructions. Main memory may comprise random access memory (RAM) to support reprogramming and flexible data storage. Buffer 666 stores data addressable by the processor. Program memory 664 stores program instructions. A display interface 608 forwards data from bus 602 to display 610. Secondary memory 612 includes a hard disk 614 and storage device 616 capable of reading/writing to removable storage unit 618, such as a floppy disk, magnetic tape, optical disk, etc. Secondary memory 612 further includes other mechanisms for allowing programs or other machine executable instructions to be loaded into the processor. Such mechanisms may include, for example, a storage unit 622 adapted to exchange data through interface 620 which enables the transfer of software and data to the processor. The system includes a communications interface 624 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 626 which carries such signals and may be implemented using wire, cable, fiber optic, phone line, cellular link, RF, memory, or other means known in the arts.

Terms such as, computer program medium, computer executable medium, computer usable medium, and computer readable medium, are used herein to broadly refer to media such as main memory and secondary memory, removable storage drive, a hard disk installed in a hard disk drive, and signals. These computer program products are means for providing instructions and/or data to the computer system. The computer readable medium is further capable of storing data, machine instructions, message packets, or other machine readable information, and may include non-volatile memory, such as a floppy, ROM, flash memory, disk memory, CD-ROM, and other permanent storage useful, for example, for transporting information, such as data and computer instructions. A computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs (also called computer control logic) may be stored in main memory and/or secondary memory. Computer programs may also be received via the communications interface. Such computer programs, when executed, enable the computer system to perform one or more aspects and other features and capabilities of the present methods as provided herein.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. For purposes hereof, a computer usable or machine readable media containing machine readable instructions, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entity.

What is claimed is:

1. A computer implemented method for retrieving a gamut mapping, the method comprising:
    sampling a plurality of color points along axes of a color space over a number of nodes defined by a destination profile LUT of a host device;
    performing a color transformation on said sampled color points to obtain input L*a*b* values;
    performing a system estimation on any of: a seed device and a seed profile, wherein a gamut mapping is incorporated, said system estimation using said input L*a*b* values to produce corresponding output L*a*b* values, said input L*a*b* values and said corresponding output L*a*b* values comprising input-output L*a*b* pairs;
    generating, for each of said input-output L*a*b* pairs, a ray having said input L*a*b* value as a start point, and said corresponding output L*a*b* value as an end point, each of said rays comprising a ray-based color model for each of said input-output L*a*b* pairs; and
    mapping out-of-gamut colors to an intersection of a boundary surface of a gamut of said host device using said ray-based models.

2. The method of claim 1, wherein said seed profile comprises any of: a historical color profile, and an ICC profile, and wherein said seed device comprises any of: a reference print engine, and a proofing device.

3. The method of claim 1, further comprises converting said input L*a*b* values to device-specific color values.

4. The method of claim 3, wherein, in response to said system estimation being performed on a seed profile, said system estimation further comprising processing said device-specific color values through a printer model contained in said seed profile to produce said corresponding output L*a*b* values.

5. The method of claim 3, wherein, in response to said system estimation being performed on said seed device, said system estimation further comprising:
 printing test patches of said device-specific color values;
 measuring at least one reflectance value from each of said printed test patches; and
 generating said corresponding output L*a*b* values from said measured reflectances.

6. The method of claim 1, wherein mapping out-of-gamut colors to said boundary surface of said color gamut comprises determining, for each out-of-gamut color, whether said end point of said ray is outside said boundary surface of said color gamut.

7. The method of claim 6, wherein, in response to said end point of said ray being outside said boundary surface, further comprising using said ray-based color model to extend said ray along a same slope between said start point and said end point to a point wherein said ray intersects said surface boundary of said gamut.

8. The method of claim 1, further comprising creating a runtime profile using said ray-based color models.

9. The method of claim 8, wherein said runtime profile creation comprises performing control-based iterations with said end point of said ray as a target color on any of: said host device, and a model of said host device, to map said end point to said intersection of said surface boundary.

10. A system for retrieving a gamut mapping, said system comprising:
 a memory;
 a storage medium for storing data; and
 a processor in communication with said storage medium and said memory, said processor executing machine readable instructions for performing the method of:
  sampling a plurality of color points along axes of a color space over a number of nodes defined by a destination profile LUT of a host device;
  performing a color transformation on said sampled color points to obtain input L*a*b* values;
  performing a system estimation on any of: a seed device and a seed profile, wherein a gamut mapping is incorporated;
  performing a system estimation on any of a seed device and a seed profile wherein a gamut mapping is incorporated, said system estimation using said input L*a*b* values to produce corresponding output L*a*b* values, said input L*a*b* values and said corresponding output L*a*b* values comprising input-output L*a*b* pairs;
  generating, for each of said input-output L*a*b* pairs, a ray having said input L*a*b* value as a start point, and said corresponding output L*a*b* value as an end point, each of said rays comprising a ray-based color model for each of said input-output L*a*b* pairs; and
  creating a runtime profile using said ray-based color models.

11. The system of claim 10, wherein said seed profile comprises any of: a historical color profile, and an ICC profile, a look up table representing the inverse and a look up table representing the forward printer model, and wherein said seed device comprises any of: a reference print engine, and a proofing device.

12. The system of claim 10, further comprises converting said input L*a*b* values to device-specific color values.

13. The system of claim 12, wherein, in response to said system estimation being performed on a seed profile, said system estimation further comprising processing said device-specific color values through a printer model contained in said seed profile to produce said corresponding output L*a*b* values.

14. The system of claim 12, wherein, in response to said system estimation being performed on said seed device, said system estimation further comprising:
 printing test patches of said device-specific color values;
 measuring at least one reflectance value from each of said printed test patches; and
 generating said corresponding output L*a*b* values from said measured reflectances.

15. The system of claim 12, further comprising mapping out-of-gamut colors to an intersection of a boundary surface of a gamut of said host device using said ray-based models, wherein said mapping comprises determining, for each out-of-gamut color, whether said end point of said ray is outside said boundary surface of said color gamut.

16. The system of claim 15, wherein, in response to said end point of said ray being outside said boundary surface, further comprising using said ray-based color model to extend said ray along a same slope between said start point and said end point to a point wherein said ray intersects said surface boundary of said gamut.

17. The system of claim 10, wherein said runtime profile creation comprises performing control-based iterations with said end point of said ray as a target color on any of: said host device, and a model of said host device, to map said end point to said intersection of said surface boundary.

18. A computer implemented method for retrieving a gamut mapping, the method comprising:
 sampling a plurality of color points along axes of a color space over a number of nodes defined by a destination profile LUT of a host device;
 performing a color transformation on said sampled color points to obtain input L*a*b* values;
 performing a system estimation on any of: a seed device and a seed profile, wherein a gamut mapping is incorporated, said seed profile comprising any of: a historical color profile and an ICC profile, and said seed device comprising any of: a reference print engine and a proofing device, wherein said system estimation uses said input L*a*b* values to produce corresponding output L*a*b* values, said input L*a*b* values and said corresponding output L*a*b* values comprising input-output L*a*b* pairs;
 generating, for each of said input-output L*a*b* pairs, a ray having said input L*a*b* value as a start point, and said corresponding output L*a*b* value as an end point, each of said rays comprising a ray-based color model for each of said input-output L*a*b* pairs; and
 mapping out-of-gamut colors to an intersection of a boundary surface of a gamut of said host device using said ray-based models, said mapping comprising determining, for each out-of-gamut color, whether said end point of said ray is outside said boundary surface of said color gamut of said host device.

19. The method of claim 18, wherein, in response to said end point of said ray being outside said boundary surface, further comprising using said ray-based color model to extend said ray along a same slope between said start point and said end point to a point wherein said ray intersects said surface boundary of said color gamut of said host device.

20. The method of claim 18, further comprising creating a runtime profile using said ray-based color models.

21. The method of claim 20, wherein said runtime profile creation comprises performing control-based iterations with said end point of said ray as a target color on any of: said host device, and a model of said host device, to map said end point to said intersection of said surface boundary of said color gamut of said host device.

* * * * *